United States Patent

[11] 3,614,565

| | | |
|---|---|---|
| [72] | Inventor | Robert E. Mierendorf<br>Greendale, Wis. |
| [21] | Appl. No. | 53,505 |
| [22] | Filed | July 9, 1970 |
| [45] | Patented | Oct. 19, 1971 |
| [73] | Assignee | Harnischfeger Corporation<br>West Milwaukee, Wis. |

[54] CONTROL FOR ELECTROMECHANICAL BRAKE
9 Claims, 1 Drawing Fig.

[52] U.S. Cl. .................................. 318/203,
318/209, 318/302
[51] Int. Cl. ........................................ H02p 3/04
[50] Field of Search .......................... 318/372,
203, 209; 188/171; 317/154, DIG. 4

[56] References Cited
UNITED STATES PATENTS
3,181,039 4/1965 Binder et al. .................. 317/154
3,084,310 4/1963 Schurr .......................... 317/123 CD
3,461,375 8/1969 Nestler et al. ................ 317/154

*Primary Examiner*—Benjamin Dobeck
*Assistant Examiner*—K. L. Crosson
*Attorney*—James E. Nilles ABSTRACT: A static brake controller supplies DC operating voltage from a bridge rectifier having SCR's in legs thereof to the brake magnet coil of an electromechanical brake to release the brake. Means including a unijunction relaxation oscillator apply gating pulses to the SCR's. RC timing circuit means disable the unijunction oscillator a predetermined interval after initial energization of the power supply transformer so that the SCR's commutate off, and a second bridge rectifier energized from a reduced voltage tap on the power supply transformer secondary applies normal holding voltage to the brake magnet coil to maintain the brake released, thereby preventing over heating of the brake magnet coil and assuring rapid resetting of the brake when the brake coil is deenergized.

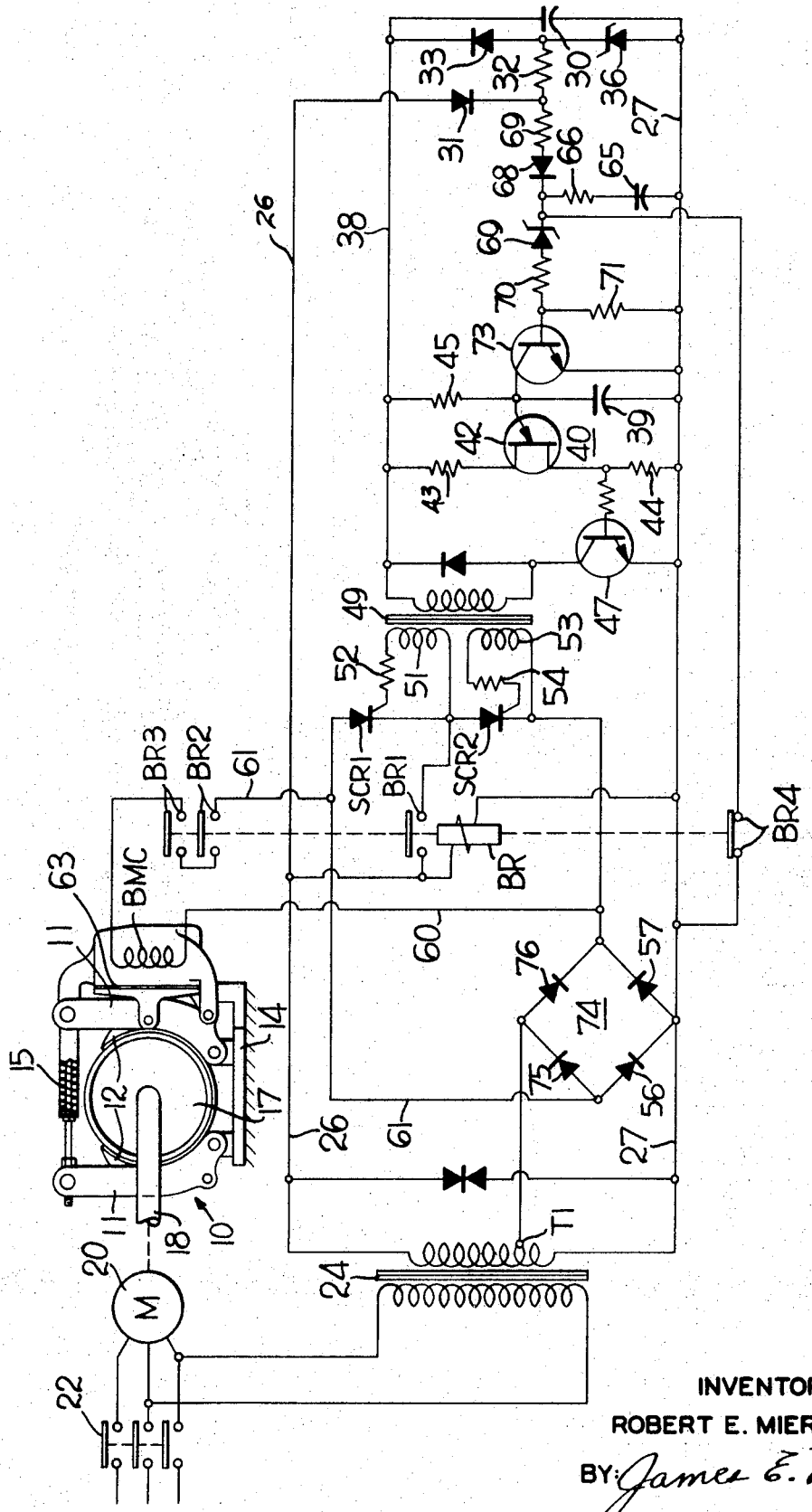

CONTROL FOR ELECTROMECHANICAL BRAKE

It should be appreciated that the invention is not intended to be limited to the particular embodiment shown and described for many modifications and variations will be oobvious to those skilled in the art.

BACKGROUND OF THE INVENTION

This invention relates to controllers for electromechanical brakes.

Direct current electromechanical brakes are frequently used to normally hold a motor shaft immobile, such as a shaft which operates the main hook of a crane, until the motor is energized to rotate the shaft. The brake may have a pair of brake jaws carrying brake shoes that are urged by spring means against a brake wheel rigid with the motor shaft to set the brake, and a brake operating magnet having an armature operatively connected to a brake jaw is adapted to actuate the armature in a direction to relieve the spring pressure from the brake jaws, and thus release the brake, when the brake magnet coil is energized. The brake may be maintained in released condition for a substantial interval while the motor shaft is being rotated to move the crane hook, and the relatively high magnitude of current which is necessary to assure quick and uniform attraction of the brake armature may result in overheating of the brake coil and also prevent the brake from rapidly setting when the brake coil is deenergized.

Brake controllers are known having a first relay which is operated to connect a full-wave rectifier to the direct current brake magnet coil and a second relay which is operated after a time delay to transfer the bridge rectifier to a reduced voltage on the power supply transformer and thus reduce the brake coil current to a magnitude which will maintain the brake released. However, the sensitivity of such second relay often changes in the field during use, and if the second relay fails to pickup, full current is continuously applied to the brake magnet coil and may burnup the brake magnet coil. Further, such prior art brake controllers necessitated field adjustment of relay sensitivity.

SUMMARY OF THE INVENTION

In accordance with the principles of the present invention, a first bridge rectifier having controlled rectifiers in legs thereof is connected to apply direct current voltage to the brake coil to release the brake, a second bridge rectifier energized from a reduced voltage tap on the power supply transformer is connected to apply normal holding voltage to the brake coil, oscillator means energized from the power supply transformer supply gating pulses to the controlled rectifiers, and RC timing circuit means energized from the power supply transformer disable the oscillator means after a predetermined interval, whereby the controlled rectifiers are commutated off after said predetermined interval and the second bridge rectifier applies normal holding voltage to maintain the brake released and thus prevents overheating of the brake coil.

It is therefore an object of the present invention to provide an improved solid state controller for an electromechanical brake which does not require field adjustment and initially supplies full DC power to the brake magnet coil to accomplish quick release, reduces the brake coil current after the brake releases to a holding current magnitude which minimizes brake coil heating and allows the brake to set more rapidly when the coil is deenergized and which has no relay which can hangup and prevent transfer to the reduced voltage tap on the power supply transformer.

These and other objects and advantages of the present invention will be more readily apparent from the following detailed description when considered in conjunction with the single FIGURE of the accompanying drawing which is a schematic circuit diagram of a preferred embodiment of the invention.

DESCRIPTION OF THE PREFERRED EMBODIMENT

The invention will be described with reference to an electromechanical brake 10 having a pair of brake jaws 11 carrying brakeshoes 12 and pivotally connected by pins to a base 14. The brake jaws 11 are normally urged by spring means 15 against a brake wheel 17 which is rigid with a motor shaft 18 to hold the shaft immobile when brake 10 is set. Shaft 18 may actuate the main hook of a crane (not shown) and is driven by a three-phase alternating current motor 20 when brake 10 is released and a contactor 22 is closed to energize motor 20 from a suitable three-phase alternating current power supply.

Closure of contactor 22 energizes the primary winding of a power supply transformer 24, and the 115 volt, 60 hertz potential on the secondary winding of transformer 24 appears across conductors 26 and 27 and energizes the operating coil of a relay BR. The alternating current voltage on conductors 26 and 27 also initiates charging of a capacitor 30 which is connected across conductors 26 and 27 in series with a half-wave rectifier circuit comprising a diode 31, a resistor 32, and a diode 33. A Zener diode 36 clips the peaks of the rectified pulses charging capacitor 30.

The voltage on capacitor 30 appearing on conductor 38 initiates charging of the emitter capacitor 39 of a unijunction free-running, or relaxation oscillator 40 including a unijunction transistor 42 having its base-one and base-two connected through resistors 43 and 44 to conductors 38 and 27 respectively. Emitter capacitor 39 of the unijunction oscillator 40 is charged through a resistor 45 by the direct current voltage on conductor 38, and when the charge on emitter capacitor 39 reaches the peak point voltage, the emitter of unijunction transistor 42 becomes forward biased, the dynamic resistance between the emitter and base-one drops to a low value, emitter capacitor 39 discharges through the emitter, and a current pulse flows in the emitter, base-one, and base-two circuits. The current pulse flowing through resistor 44 develops a voltage which forward biases the base of a transistor 47 and turns it ON. Current then flows from conductor 38 through the primary winding of an SCR triggering transformer 49 in series with the collector-emitter circuit of transistor 47 to conductor 27. SCR triggering pulse transformer 49 has one secondary winding 51 connected in series with a resistor 52 and the gate-cathode circuit of a thyristor, or controlled rectifier SCR1 and another second winding 53 connected in series with a resistor 54 and the gate-cathode circuit of a thyristor, or controlled rectifier SCR2.

Thyristors SCR1 and SCR 2 together with a pair of diodes 56 and 57 comprise a full-wave rectifier bridge which is energized from the 115 volt alternating current potential appearing across conductors 26 and 27 and delivers approximately 100 volts DC to the brake magnet coil BMC of brake 10. Operation of relay BR from the AC voltage appearing across conductors 26 and 27 closes a first set of contacts BR1 of relay BR to connect conductor 26 to one side of the full-wave rectifier bridge at the junction of thyristors SCR1 and SCR2, and the other side of the rectifier bridge at the junction of diodes 56 and 57 is connected to conductor 27. One side of brake magnet coil BMC is connected by lead 60 to one DC terminal of the bridge rectifier and operation of relay BR closes its sets of controls BR2 and BR3 to connect brake magnet coil BMC over conductor 61 to the other DC terminal of the bridge rectifier.

The voltage induced in secondary windings 51 and 53 of SCR triggering transformer 49 when transistor 47 conducts results in application of gating signals to thyristors SCR1 and SCR2 so that the bridge rectifier delivers full DC current to brake magnet coil BMC. Energization of brake coil BMC attracts the brake magnet armature 63 which is operatively connected to one of the brake shoes 11 and releases the pressure of springs 15, thereby releasing brake 10 and permitting motor 20 to rotate shaft 18. Unijunction relaxation oscillator 40 continuous to deliver current pulses which are coupled through transistor 47 and SCR triggering transformer 49 to gate-controlled rectifiers SCR1 and SCR2.

Gating signals are removed from controlled rectifiers SCR1 and SCR2 a predetermined interval after initial energization of power supply transformer 24 to disconnect full operating voltage from brake magnet coil BMC and to apply normal holding voltage to brake coil BMC. Such predetermined interval is of sufficient duration to insure release of brake 10, for example, 1 second. A timing capacitor 65 of an RC timing circuit is charged through a timing resistor 66 in series with a half-wave rectifying circuit comprising a diode 68, a resistor 69 and diode 31 across conductors 26 and 27. The charge on timing capacitor 65 builds up after said predetermined interval to a sufficiently high voltage to break down a Zener diode 69 and impress the voltage appearing on timing capacitor 65 across a voltage divider comprising two resistors 70 and 71 in series. The voltage across resistor 71 forward biases the base of an NPN transistor 73 and turns it ON to short circuit the emitter of unijunction transistor 42 to conductor 27, thereby turning the relaxation oscillator 40 off and stopping the gating pulses to thyristors SCR1 and SCR2. The thyristors SCR1 and SCR2 turn off at current zero and thus remove the 100 volt DC output voltage of the bridge rectifier from the brake magnet coil BMC.

The AC terminals of a second full-wave bridge rectifier 74 comprising diodes 56 and 57 and two diodes 75 and 76 are connected across a reduced voltage tap T1 on the second winding of power supply transformer 24 and conductor 27 so that sufficient AC voltage, for example 14 volts, is impressed across bridge rectifier 74 to maintain brake 10 released. On DC terminal of bridge rectifier 74 is connected over lead 60 to the brake magnet coil BMC, and the other DC terminal of bridge rectifier 74 is connected over conductor 61 and relay BR contacts BR2 and BR3 to the other side of brake magnet coil BMC. Bridge rectifier 74 may deliver normal brake holding voltage to the brake coil BMC, thus holding brake 10 released but minimizing heating of brake coil BMC. The reduced, or holding current to brake coil BMC also assures rapid resetting of brake 10 when contactor BR is opened.

A pair of normally closed contacts BR4 on relay shorts timing capacitor 65 to conductor 27 when relay BR releases to provide fast reset of the timing circuit which controls the period of operation of relaxation oscillator 40.

It will be appreciated that the disclosed static brake controller does not utilize a relay for transferring transferring brake coil to the reduced voltage tap on the power supply transformer, thereby assuring that the brake coil cannot be overheated as a result of a relay failing to pick up. It will further be appreciated that this disclosed static brake controller eliminates the necessity of field adjustment.

It should be appreciated that the invention is not intended to be limited to the particular embodiment shown and described for many modifications and variations will be obvious to those skilled in the art.

I claim:

1. A static brake controller for an electromechanical brake having a brake coil for releasing the brake when the brake coil is energized, comprising in combination,
 a power supply transformer having a reduced voltage tap on the secondary winding thereof,
 a first full-wave rectifier having a controlled rectifier in at least one leg thereof connected to be energized from said secondary winding and to apply the direct current output voltage to said brake coil to release said brake,
 means energized from said power supply transformer for applying gating pulses to said controlled rectifier,
 a second full-wave rectifier connected to be energized from said reduced voltage tap on said seconding winding and to apply the direct current output voltage thereof to said brake coil to hold said brake released, and
 means including an RC timing circuit energized from said secondary winding for disabling said gating pulse applying means a predetermined interval after said power supply transformer is energized, whereby said controlled rectifier is turned off after said predetermined interval and said second full-wave rectifier applies reduced voltage to maintain said brake released.

2. A static brake controller in accordance with claim 1 wherein said means for applying gating pulses includes a relaxation oscillator and rectifying means energized from said power supply transformer secondary winding for supplying direct current current voltage to said relaxation oscillator.

3. A static brake controller in accordance with claim 1 including a brake relay having a first set of normally open contacts adapted when closed to connect said first full-wave bridge rectifier to said brake coil.

4. A static brake controller in accordance with claim 3 wherein said brake relay has a second set of normally open contacts adapted when closed to connect said power supply transformer secondary winding to said first full-wave bridge rectifier.

5. A static brake controller in accordance with claim 4 wherein said brake relay has a set of normally closed contacts adapted when closed to discharge the timing capacitor of said RC timing circuit.

6. A static brake controller in accordance with claim 5 wherein said brake relay has an operating coil connected to be energized from the secondary winding of said power supply transformer.

7. A static brake controller in accordance with claim 2 wherein said first and second full-wave rectifiers are bridge rectifiers and a pair of diodes is common to both said rectifiers, said first bridge rectifier has a pair of SCR's in legs thereof, and said means for applying gating pulses supplies trigger pulses to both of said SCR's and includes a trigger pulse transformer having its primary winding coupled to said relaxation oscillator and having a pair of secondary windings each of which is coupled to the gate-cathode of one of said SCR's.

8. A static brake controller in accordance with claim 2 wherein said relaxation oscillator is a unijunction oscillator and said means for disabling includes a timing capacitor connected in series with a timing resistor and a rectifier across said power supply transformer secondary winding and means for shorting said unijunction oscillator in response to a predetermined voltage built up across said timing capacitor.

9. A static brake controller in accordance with claim 8 wherein said unijunction oscillator includes a unijunction transistor and an emitter-capacitor coupled to the emitter of said unijunction transistor and adapted to be charged by said rectifying means for supplying direct current to each relaxation oscillator, and wherein said means for shorting said unijunction oscillator includes a transistor connected to short circuit said emitter capacitor when said transistor is turned on and means including a Zener diode coupled to said timing capacitor for forward biasing the base of said transistor in response to a predetermined voltage build up across said timing capacitor.